Patented Jan. 4, 1944

2,338,608

UNITED STATES PATENT OFFICE 2,338,608

BEVERAGE PREPARATION

Mark Weisberg, Providence, and Louis Corman, Cranston, R. I.; said Corman assignor to said Weisberg No Drawing. Application December 16, 1941, Serial No. 423,222

3 Claims. (Cl. 99—71)

This invention relates to the process of preparing fresh liquid aqueous coffee extracts and maintaining the freshness and stability of the same. Our process relates moreover to a process of preserving the delicious taste, flavor and pleasant aroma characterizing a cup of freshly brewed coffee over an indefinte length of time. By our process those qualities distinctly associated with a fresh brew of coffee made from the fresh properly roasted clean beans are retained in a liquid aqueous extract even after months and years.

It is an object of our invention to prepare an aqueous coffee extract and preserve it without substantial deterioration in quality of taste, aroma, flavor and appearance.

It is also an object of our invention to prepare a liquid coffee extract from which no sediment will be deposited and that requires no addition of a chemical agent of any type to prevent or reduce the formation of sediment. With the previous liquid coffee extracts with which we are familiar, this sedimentation formation has always been a troublesome problem. Our extract requires no physical or chemical clarification.

In our process, there is prepared from roasted coffee beans an extract which is brilliantly clear when it first runs out of the leaching system and it remains so indefinitely.

There are various methods we may use in preparing the aqueous extracts of coffee, care being taken always not to subject the roasted coffee to exceedingly high ranges of extraction temperature particularly over long periods of time resulting consequently in cloudiness or sedimentation formation in the resulting extract secured. Another reason for this precaution is the change in the quality of the brew.

In the preferred method of making our liquid coffee extract hot water of 60–100° C. is run into the first unit of the leaching system in a continuous manner. This system is preferably made of stainless steel tanks since any chemical reaction of metal with coffee constituents is eliminated. The liquors become progressively richer and they also become colder as they pass through successive units of the system, each of which is charged with fresh ground coffee.

The direction of flow is preferably downward through the respective units, the number of which may vary. The liquors become colder as they pass through the leaching system not because of artificially applied cooling but simply because of abstraction of heat by the ground coffee which has been charged into the units at room temperature. So whereas the water employed may be 100° C. in temperature, the temperature of the aqueous extract in the first unit is substantially below 100° C. because of the heat exchange. Thus the temperature throughout the first unit will average less than 90° C. usually. The concentration of extracted material is highest in the last unit and the extract is drawn off here at about room temperature. The extract obtained will be absolutely fresh provided fresh roasted coffee beans are employed and ordinary care is taken regarding cleanliness of the leaching system and leaching water. It possesses the following characteristics:

1. Clarity: brilliantly clear
2. Sediment: none
3. Aroma: very pleasant aroma of fresh coffee
4. Taste and flavor: equal to a very fresh cup of excellently brewed coffee.

The liquid aqueous coffee thus obtained is stored away in a cold room kept near the freezing point of the extract. For best results the freshly made extract is placed immediately in cold storage. An extract can be permitted to stand for a period at ordinary room temperature, then placed in the cold room, the time interval depending upon the concentration. The weaker the extract is, the less stability it possesses at room temperature or higher. Thus a 5° Tw. extract will deteriorate at room temperature much more rapidly than a 20° Tw. extract.

An extract with a concentration of 15° Tw. or higher can be permitted to stand at room temperature for a day or two; and when tested by the olfactory senses, the quality designation will be quite satisfactory. However after two days standing at ordinary room temperature, a very noticeable change in that exquisite freshness of taste and flavor of freshly brewed coffee occurs. The quality of the coffee extract at the end of even 4–5 days storage of like temperature range would be graded fairly good.

If this extract is permitted to set about 2–3 weeks under normal room temperature conditions, the deterioration in quality will be found to be very marked not only in change of taste and flavor, but also in the physical appearance and aroma of the extract. Such changes as occur are to be found tabulated in the table hereunder. The longer the extract is stored at room temperature the worse the qualities become it will be observed, until after 6 or 7 weeks the appearance, taste, flavor and aroma have become so poor as to make the product decidedly objectionable in appearance as well as in aroma and taste. The extract will have become at this period very muddy and contain an excessive amount of sediment and suspended matter, indicating very serious decomposition of the original ingredients. This ageing of liquid coffee extracts at ordinary room temperature or higher is not in any sense limited to the aqueous liquid extracts made by our extraction process, but characterizes every aqueous liquid extract of which we have any knowledge or have had in our wide experience.

These phenomena of deterioration spell serious economic losses to the manufacturer due to spoilage. These losses may result because of any one or more of the following reasons:

(a) Loss of sales due to discovery by consuming public that the coffee extract has deteriorated so badly during storage that same has a disagreeable taste and flavor.

(b) Return to manufacturer of packaged extract from distributor, of material which has developed appreciable mud or sediment after more than two weeks shelf storage.

(c) Returns from the distributor may also arise from his discovery that the aged extract has lost its original fresh aroma, taste, flavor and also that it may have developed mold growth.

(d) Appreciable losses have also occurred as the result of explosive bursting of containers of liquid extract which have been stored but a few days at a room temperature of say 85° F. during warm weather. The bursting of the containers is due to development of excessive gas pressure resulting from rapid deterioration of the extract.

The freshly prepared coffee extract or that whose quality has not been adversely effected by too long standing as indicated is held in the refrigerator or cold storage room at a temperature close to the freezing point of the liquid coffee extract. The extract in this way is kept absolutely fresh and stable for many months or even longer. Tests as indicated hereunder have demonstrated conclusively that this cold storage positively maintains the full original exquisite aroma, taste and flavor the extract had when placed in a freshly prepared condition in the cold chamber several months previously.

The optimum storage temperature is approximately 20° to 50° F. It is preferred to employ a temperature range of from slightly below to slightly above the freezing point of the extract during storage. Although 50° F. has been cited as the upper limit of our optimum cold storage range, we do know that storage at temperatures even as high as 60° F. will arrest deterioration of coffee extracts fairly well, especially if these extracts be highly concentrated, such as for example of 60° Twaddell strength.

Below the lower range above given there results an economical loss due to the maintenance of such a low temperature, whereas above the upper range indicated the danger of spoilage is enhanced. Experiments have been carried out with varying concentrations of liquid coffee extracts. Coffee extracts of as low a concentration as drinking strength, Tw. 0.5° (measured at 70° F. i. e., room temperature) kept satisfactorily when held at either just below or just above its freezing point. Our experience has been that the more highly concentrated the extract the better it keeps in the upper range. This is particularly the case if the storage temperature begins to approximate 60° F. However by storing liquid coffee extracts at concentrations ranging from 10 to 60° Tw. in a refrigerator at 20° to 50° F., we have been able to preserve perfectly for months the original freshness and quality as attested by careful observations on those important properties listed in the tests herein. It is obvious that ranges above 60° Tw. concentration can likewise be preserved under those temperature range conditions above indicated.

It of course follows that the aqueous coffee extracts regardless of concentration can be permitted to stand at ordinary room temperature or even higher even to the point of a slight deterioration of quality, then placed in cold storage of the intensity indicated thereby permanently arresting any additional deterioration. But as indicated it is preferred to take the extract coming from the ground roasted coffee beans and immediately or within a few hours thereafter, place it in the cold room thereby securing the delicate bouquet and distinctive flavor at its maximum.

The following are examples of our process.

*Example I*

A water extract of freshly ground roasted coffee beans was made using ordinary tap water, nothing added, in a manner as indicated in the continuous method described previously. A one gallon sample of this freshly made coffee extract having a density of 20° Tw. at 70° F. was divided into two equal parts and transferred to two ordinary narrow neck glass bottles of ½ gallon capacity each, provided with the commonly used Bakelite style screw caps. Both bottles after screwing the cap on firmly were immediately stored away, one in a refrigerator at 32 to 38° F., the other in a dark cabinet at room temperature which averaged approximately 70° F. during the entire storage period. Observations were made periodically on these two samples of coffee extract to determine the degree of deterioration going on with regards to the following properties:

1. Clarity of extract
2. Amount of sediment
3. Aroma
4. Taste and flavor

In making these periodic observations the amount of sediment was first noted, then the bottles of liquid extracts were shaken in order to build a head of foam which is utilized to emphasize the intensity of the aroma. The aroma of the extracts is noted by removing the caps from the bottles immediately after shaking. A check on this property was obtained later when hot glasses of coffee of drinking strength were prepared for observations as to taste and flavor as well as clarity. In preparing this coffee of drinking strength exactly 8 cc. of 20° Twaddell coffee extract was mixed with 150 cc. of hot freshly boiled tap water in a transparent glass or beaker. Immediate observations were made as to the clarity, aroma, taste and flavor of this hot coffee solution. The following table summarizes the data taken at various intervals of a six month storage period on 20° Tw. coffee extract:

| Age of extract | Clarity of solution at drinking strength | | Sediment | | Aroma | | Taste and flavor | |
|---|---|---|---|---|---|---|---|---|
| | C. S. S. | R. T. S. | C. S. S. | R. T. S. | C. S. S. | R. T. S. | C. S. S. | R. T. S. |
| 1 day | Brilliantly clear. | Brilliantly clear. | None | None | Fresh | Fresh | Very fresh | Very fresh. |
| 2 days | do | do | do | do | do | do | do | Fresh but not as fresh as C. S. S. |
| 3 days | do | do | do | do | do | do | do | Good but less fresh than previous day. |
| 7 days | do | do | do | do | do | Not as fresh as C. S. S. | do | Fair, but definitely not fresh now. |
| 2 weeks | do | Very slightly cloudy. | do | Small amount sediment. | do | Definitely poorer than C. S. S. | do | Decidedly inferior to C. S. S. |
| 1 month | do | Very cloudy. | do | Appreciable sediment. | do | Poor | do | Quite poor. |
| 2 months | do | do | do | do | do | do | do | Poor. |
| 3 months | do | do | do | do | do | do | do | Do. |
| 4 months | do | do | do | do | do | do | do | Do. |
| 5 months | do | do | do | do | do | do | do | Do. |
| 6 months | do | do | do | do | do | do | do | Do. |

Abbreviations: C. S. S.=cold storage sample.
R. T. S.=room temperature sample.

Example II

A one gallon sample of similarly prepared freshly made liquid coffee extract having a density of 40° Tw. at 70° F. was divided into two equal parts and transferred to two ordinary narrow neck glass bottles of ½ gallon capacity each, provided with the commonly used Bakelite style screw caps. Both bottles after screwing the cap on firmly were immediately stored away, one in a refrigerator at 32 to 38° F., the other in a dark cabinet at room temperature which averaged approximately 70° F. during the entire storage period. This extract like the one in Example I, contained no other ingredients than ordinary tap water and the water soluble components of freshly roasted coffee bean. The same tests were made on this 40° Tw. extract as were made on the 20° Tw. after six months storage. The following observations were recorded.

| Clarity of solution at drinking strength | | Sediment | | Aroma | | Taste and flavor | |
|---|---|---|---|---|---|---|---|
| C. S. S. | R. T. S. | C. S. S. | R. T. S. | C. S. S. | R. T. S. | C. S. S. | R. T. S. |
| Brilliantly clear. | Very cloudy. | None | Appreciable sediment. | Fresh | Poor | Very fresh | Poor. |

Example III

Example I was repeated using 10° Tw. coffee extract in place of 20° Tw. After six months storage the following observations were recorded.

| Clarity of solution at drinking strength | | Sediment | | Aroma | | Taste and flavor | |
|---|---|---|---|---|---|---|---|
| C. S. S. | R. T. S. | C. S. S. | R. T. S. | C. S. S. | R. T. S. | C. S. S. | R. T. S. |
| Brilliantly clear. | Very cloudy. | None | Appreciable sediment. | Fresh | Poor | Very fresh | Poor. |

Attaining the selected degree Tw. of the extract is a matter which is based on numerous laboratory runs. By using hot water of relatively constant temperature and controlling its rate of flow through a leaching system containing for each unit a constant ratio of weight of dry coffee charge to volume, a definite constant Tw. extract can be attained. A chart or table can be worked out for each system where there are these variables such as number of units, volume ratio, and rate of flow, etc.

In the above recorded data, all Tw. values tabulated were made at 70° F. (approximately room temperature).

It is to be understood that the foregoing examples are illustrative only and are not restrictive.

Furthermore liquid mixtures of coffee extract and other food products which contain appreciable percentages by weight of coffee extract, which percentages constitute a major proportion of the mixture come within the scope of our invention. For instance, a concentrated freshly prepared coffee extract may be mixed with cream or milk with or without sugar and without or with gelatine. The purpose of the gelatine is to convert the mixtures into jels and prevent separation of the same into two layers which occur when no thickener is introduced.

The following is a typical example of the concentrated coffee mixture we have found to be highly resistant to deterioration of aroma, taste, flavor and appearance.

| | Pounds |
|---|---|
| Liquid coffee extract (about 23% solids) | 100 |
| Sugar | 100 |
| Fresh cream (50% butter fat) | 200 |
| Gelatine | 8 |

This mixture after allowing to set reverts to a soft jelly like body which is a very convenient form for handling by the consumer. On dissolving about 40 grams of the above mixture in 140 grams of freshly boiled water a most refreshing cup of excellent tasting coffee is obtained. The above formula can be prepared without sugar if desired. There are many other ways in which the above formula may be modified it is apparent, keeping in mind that the concentration of coffee extract solids in above formula must not be appreciably less than 2½%. Of course the water could be removed from the freshly prepared coffee extract and this solid extract used in place of the liquid, the water being obtained from that present in the milk or the cream or other compounding aqueous fluids. Other sweetening agents such as saccharin, glucose, milk sugar, brown sugar, molasses, etc. may replace the cane sugar; and other thickeners such as pectins, agar agar, gum tragacanth, gum karaya, dextrine, casein, starch, etc., may take the place of the gelatine.

We claim:

1. The process of preparing coffee extracts of 0.5° Tw. and upward which retain their original brilliant clearness, fresh delicious taste, flavor and aroma after storage for days to months which comprises the steps of successively leaching in a continuous manner with an aqueous liquid at a temperature of from 60° C. to 100° C. separate portions of freshly roasted ground coffee, the extracts becoming successively richer and cooler as they progress from portion to portion, leaving the last portion of coffee at room temperature brilliantly clear, chilling the extracts below 60° F., the extracts still maintaining their clearness and storing them for from days to months at a temperature of from just below freezing point of the extract to about 50° F., and withdrawing the extract from storage still retaining its original taste, flavor, aroma and brilliant clearness.

2. The process of preparing coffee extracts which retain the original clearness and fresh delicious taste, flavor and aroma after storage for days to months which comprises the steps of making an aqueous extract of roasted coffee of a density of 0.5° Tw. and upward by contacting a flowing aqueous liquid initially at a temperature of from 60° C. to 100° C. with successive portions of freshly roasted coffee, the extract increasing in strength and decreasing in temperature leaving the last portion of coffee at room temperature brilliantly clear and sedimentless, chilling the extract below 60° F. while still maintaining its clearness and storing it for periods of from days to months at a temperature of from just below to somewhat above freezing point of the extract, and withdrawing the extract from storage while still retaining its original taste, flavor, aroma and brilliant clearness.

3. The process of preparing and stabilizing coffee extract which retains the original clearness and fresh delicious taste, flavor and aroma after storage for days and months which comprises the steps of making an aqueous extract of roasted coffee of a density of 0.5° Tw. and upward contacting a flowing aqueous liquid initially at a temperature of from 60° C. to 100° C. with separate portions of ground roasted coffee of room temperature, the extract increasing in strength and decreasing in temperature by heat exchange with the portions of coffee through which it passes, leaving the last portion of coffee brilliantly clear and sedimentless, chilling the extract below 60° F. while still maintaining its clearness and storing it for periods of from days to months at a temperature of from just below to somewhat above freezing point of the extract, withdrawing the extract from storage while still retaining its original taste, flavor, aroma and brilliant clearness.

MARK WEISBERG.
LOUIS CORMAN.